April 30, 1957   R. BIZE   2,790,549
AUTOMATIC WEIGHING SYSTEMS
Filed Feb. 10, 1953   4 Sheets-Sheet 2

RENÉ BIZE
BY:

April 30, 1957 R. BIZE 2,790,549
AUTOMATIC WEIGHING SYSTEMS
Filed Feb. 10, 1953 4 Sheets-Sheet 3

RENÉ BIZE

BY:

United States Patent Office 2,790,549
Patented Apr. 30, 1957

2,790,549

AUTOMATIC WEIGHING SYSTEMS

René Bize, Saint-leu-la-Foret, France, assignor, by mesne assignments, to "Le Pesage Automatique," Asnieres (Seine), France, a corporation of France Application February 10, 1953, Serial No. 336,141

Claims priority, application France February 14, 1952

3 Claims. (Cl. 209—121)

This invention relates to automatic weighing procedures and systems. Various manufacturing processes involve the requirement of weighing a great many articles, such as mechanical parts, or metered amounts of solid or liquid materials, or packages of any description, with high accuracy and in a minimum time. In many cases, production parts have to be tested for weight, and overweight and underweight parts discarded or scrapped. In other cases it may be necessary to test the weights of individually produced parts or packed amounts of materials, and sort the parts or packages according to weight; or it may be required to count or meter the output products. In all these and similar cases, high speed and a high degree of automaticity are desirable.

It is an object of this invention to provide an improved weighing procedure, which is particularly suitable for automatic operation in connection with production and manufacturing processes.

Another object is to provide such a method which will not impair the precision of the weighing means used; and to provide such a method which will increase the over-all accuracy by the elimination of the personal error factor which is always present where manual operations are involved.

Another object is to provide an automatic weighing system for quickly and accurately weighing a large number of articles.

A further object is to provide such a system wherein provision is made for the automatic and selective performance of various steps, the selection of which depends on the particular weight of the individual articles being weighed. A more specific object is to provide improved means for automatically weighing a plurality of articles and sorting said articles according to weight.

A further object is to provide improved electro-dynamometric weighing means.

A further object is to provide improved apparatus for the automatic performance of various continuous processes involving cyclic weighing steps.

The above and further objects of the invention will appear as the disclosure proceeds.

My invention essentially contemplates an improved weighing method which comprises approximately compensating for the weight of the object being weighed by means of a fixed tare, and then controllably applying a varying, and preferably incrementally increasing, electrodynamic force in a suitable direction until the weight of the object is accurately compensated for.

In the accompanying diagrammatic drawings, which illustrate some embodiments of the invention for purposes of indication but not of limitation, Fig. 1 is a diagram showing a simplified embodiment;

Figure 1:
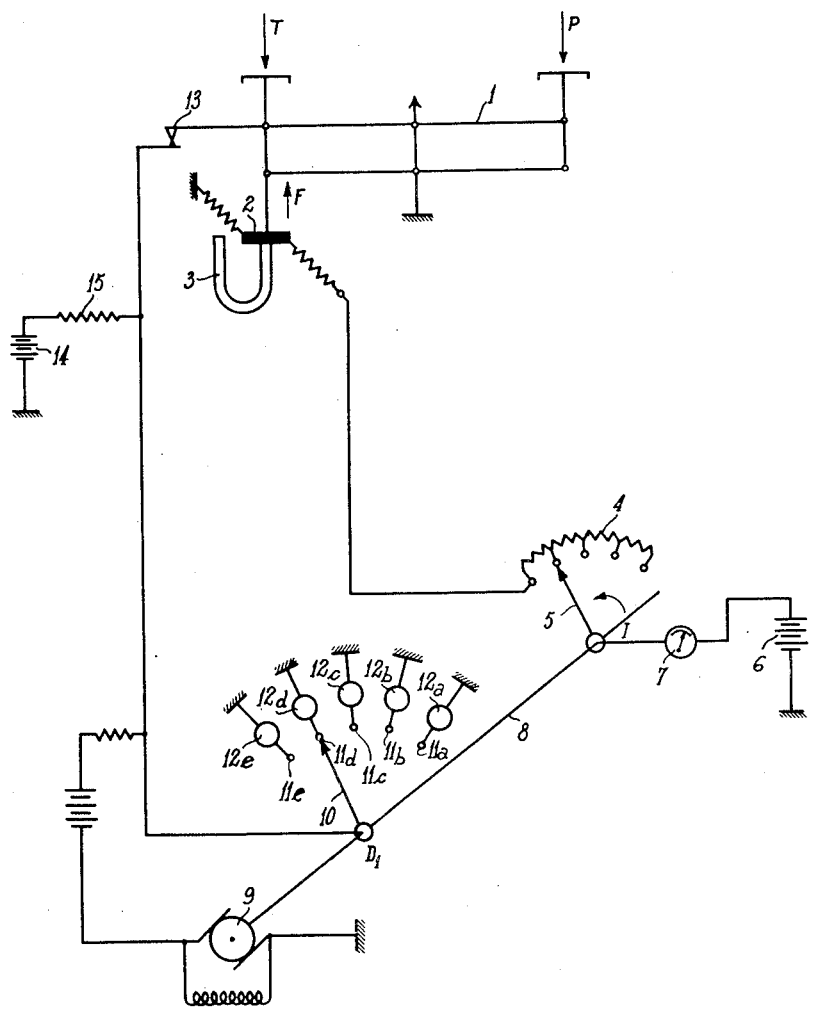

As shown in Fig. 1, the arrangement may comprise a balance 1, of any suitable type such as the simple type of scales shown. The weight P of an object being weighed is approximately balanced by a tare T and an additional electrodynamic force F is applied. This force is produced by an induction coil 2 subjected to a uniform field created by a permanent magnet 3 and connected in an adjustable supply circuit for feeding a current of predetermined magnitude through the coil.

As shown, the coil 2 is so mounted on a downward extension of the upright supporting the pan of the scales, and is so connected in the supply circuit, that the electromagnetic force F exerted by the coil is directed in an upward direction. Hence, we may write $$P = T - F$$

Since $F = KI$, where K is a constant and I is the current flowing through the coil, we have $P = T - KI$, which shows that a balanced condition of the scales is reached for a certain value of the supply current I fed to the coil. Thus, in order to perform a weighing operation to within a given tolerance $\Delta P$, it will only be necessary to vary the supply current I from a certain minimum value $I_{min}$ to a maximum value $I_{max}$, so selected that the corresponding variation of the generated force F, will be $$F = 2\Delta P$$

The current I is made controllable by inserting a variable resistor 4 in the supply circuit of the coil, the adjustable arm 5 of the resistor being connected to one side of a source of constant voltage 6. As shown, the return connection from the other side of the source or battery 6 to the other end of the coil 2 is through ground. A suitable milliammeter 7 or the like is preferably interposed between the resistor contact 5 and the battery 6.

The movable arm 5 is connected through a suitable mechanical transmission such as a shaft schematically indicated by the line 8, to be driven from an electric motor 9 through a suitable reducer gearing not shown. Mounted on the shaft 8 is a further rotatable arm 10. The arm 10 is adapted to engage in succession a series of contacts 11a, 11b, 11c, . . . 11e. The said contacts are interposed, as diagrammatically illustrated, in the energizing circuits of respective load devices such as solenoids or relay windings 12a, 12b, 12c, . . . 12e. The energizing circuit for each winding 12 is from a D.-C. voltage source or battery 14, through a resistor 15, selector arm 10, the related contact 11, the related winding 12, and thence through ground to the other side of source 14.

Connected for actuation by the beam of the scales is a movable contact cooperating with a stationary contact to operate a switch 13. The arrangement is such that the switch 13 is opened on upward movement of the left hand pan of the scales beyond the position of equilibrium. The switch 13 is connected on one side of the resistor 15 and arm 10, and on the other side through the frame of the scales to ground. Thus it is seen, assuming the tare T is initially greater than the weight P of the object being weighed, that the arm 10 will be grounded through switch contacts 13 so long as the force F has not attained a value great enough to raise the left hand pan of the scales to or beyond equilibrium position.

In operation, assume the resistor adjusting arm 5 is initially in its endmost right hand position in which the resistance inserted in the supply circuit of the coil 2 is a maximum and the current I flowing through the coil is consequently a minimum, and the motor 9 is started to move the arm 5 in the counterclockwise direction indicated by an arrow. As the arm 5 successively engages the resistor contacts, the current I through the coil rises incrementally. The electromagnetic force F developed by the coil 2 in the uniform field of magnet 3 increases accordingly, exerting an increasing upward force on the left hand pan of the balance, i. e. a force directed in aiding relationship to the weight P of the object being weighed and in opposition to the tare T.

Concurrently with the rotation of arm 5, arm 10 is rotated in the same counterclockwise direction to engage successively the contacts 11a, 11b, &c. However, because the switch 13 is closed, grounding the conductor connected to said arm, all of the related load windings 12 remain deenergized regardless of the position of arm 10. At the instant the resistor adjusting arm 5 has engaged a certain one of the associated resistor contacts, for example the fourth contact as shown, such that the current I then flowing through the coil 2 is sufficient to develop a force F great enough to raise the left hand pan of the scales above the position of equilibrium, thereby disengaging switch contacts 13, energizing current flows from source 14 through resistance 15 and arm 10 to the particular one of the contacts 11 with which the selector arm 10 is in engagement at the time, e. g. contact 11d as shown, and thence through the related load winding 12d and back through ground to the D.-C. source 14.

It will be understood that the relays or windings such as 12a to 12e may be used in any well-known manner to actuate suitable devices for performing desired selective operations in connection with the processing of the objects or materials being weighed.

For example, the relays 12 may be connected for the actuation of weight meters or—where discrete objects are being weighed—counters; or said relays may actuate sorting devices, adjusting elements, or arrangements for automatically eliminating off-tolerance articles in production. One practical example of a complete system, in which the windings 12 are used for sorting purposes, wil be described later with reference to Fig. 4. The number of contacts 11 and associated relays 12 is of course arbitrary, and, while five have been shown for purposes of illustration, such number may obviously vary with the purpose in hand, as well as the accuracy of the weighing process desired.

Further, it should be understood that the selector arm 10, rather than acting to complete electric relay energizing contacts as shown, may equally well be made to act directly, through suitable mechanical connections, upon the respective load devices used.

Returning to the basic diagram of Fig. 1, it should be observed that the provision of a resistance 4 adjustable in steps as contrasted with a continuously variable resistance is advantageous in that the resulting incremental or discontinuous variation induced in the force F tends to enhance the sensitivity of the balance, producing an effect somewhat comparable to that obtained by tapping the scales during a manual weighing operation.

Desirably, the motor 9 may be started automatically upon the object or material to be weighed being placed on the pan of the balance. Arrangements suitable for this purpose can readily ge designed by those familiar with the art by the use of photo-electric cells, or under the control of a switch actuated by a production line, and so forth. One simple arrangement for this purpose will be described with reference to Fig. 4. Similarly, the motor 9 can be reversible and operated to return the adjustable arms 5 and 10 to their original zero position (to the right in the drawings) by similar automatic actuating means on removal of the object or material from the pan of the balance.

Figure 2:
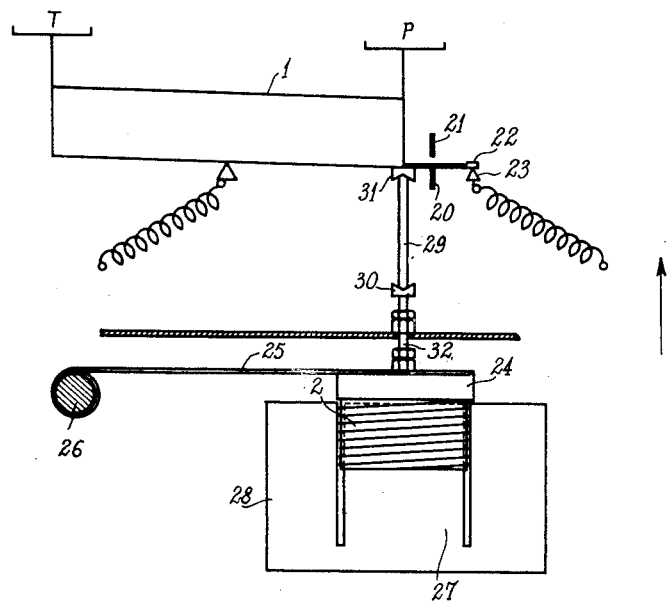
Fig. 2 illustrates diagrammatically one construction of the electrodynamometer used.

Fig. 2 illustrates diagrammatically though in more detail than Fig. 1, one possible construction for the electrodynamometer device. As shown, the displacements of the balance beam 1 are limited between two closely spaced end positions by a pair of limit stops 20—21. The previously mentioned contacts 13 are defined by an extension 22 of the balance beam cooperating with a fixed contact element 23.

The electrodynamometer assembly comprises an outer cylindrical magnetic core structure 28 having a cylindrical recess therein coaxial with the vertical path of movement of a pan of the scales. Secured in the recess in coaxial alignment with it is a cylindrical inner core member 27 defining an annular airgap with the outer core structure. A coil 2 wound on a thin annular support of nonmagnetic insulating material is arranged for displacement within the airgap between the outer and inner core members. The coil support is secured by means of a base 24 to the under side of an arm 25, preferably made of somewhat flexible material, pivoted on a horizontal pin 26. The vertical displacements of coil 2 are transmitted to the scales structure through a coupling comprising a rod 29 mounted between a pair of cup-like seats 30 and 31. The seat 30 is coupled to the base 24 of the coil through a rod 32, while seat 31 is secured to the balance frame.

Figure 5:
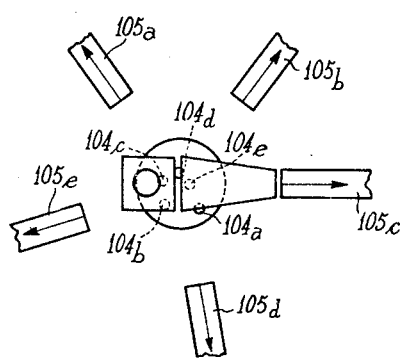
Fig. 5 is a plan view of part of the sorting system of Fig. 4.

There will now be described, with reference to Figs. 4 and 5, one manner in which the basic arrangement of the invention, described above, may be applied for the purpose of sorting articles according to their weight. Parts similar to those shown in Fig. 1 have been given the same references.

As shown, arranged to cooperate with the test pan of the balance 1 is an inclined chute 100 extending from the top of a rotatable upstanding shaft 101 adapted to be driven in rotation by an electric motor 102 through a suitable friction coupling or the like, not shown. Secured on the shaft 101 below the chute is a turntable 103 having holes or notches 104a—104e formed in its under side, at selective distances from the centre of the turntable; for instance the holes 104 may be formed along a spiral line. Fixedly mounted to cooperate with the chute 100 in various set positions of the latter are a plurality of inclined sorting channels 105a—105e. Each channel may lead to a separate sorting compartment which is to receive only those articles the weight of which lies within a corresponding narrow range. The endmost channels 105a and 105e might perhaps lead to rubbish heaps or other disposal means for scrapping underweight and overweight articles respectively.

The holes 104 correspond in number to that of the sorting channels 105. Arranged beneath the turntable 103 are a plurality of vertically slidable selector fingers 106a—106e corresponding in number to that of the holes or the channels, and so positioned that each finger when in its uppermost position will engage a corresponding one of the holes. Thus as an example finger 106c when moved upwards will engage hole 104c. Engagement of a finger into its related hole will stop the turntable and the chute in a position wherein the chute registers with a corresponding sorting channel. Thus, again supposing finger 106c has been raised to engage hole 104c, the turntable will stop at the point in its revolution where the chute 100 registers with the inlet to sorting channel 105c. The fingers 106 are actuated by solenoid means to be further described presently.

The energizing circuit for motor 102 extends as shown, from ground through the motor field windings (not shown), over a lead 120, through normally closed contacts 122 to the positive terminal of a D.-C. source 124. Contacts 122 are actuated to their open position on energization of an associated relay winding 110. This relay winding has one end grounded, and the other end connected by a lead 132 to the positive side of a D.-C. source 128. The other side of source 128 is connected by a lead 130 with the fixed element of the balance-operated switch 13, the other element thereof being grounded through the structure of the balance 1, as shown. Thus it is seen that relay 110 is energized to break the contacts 122 and stop the operation of motor 102 whenever the balance switch 13 is closed.

The scanning motor 9 operating the selector arms 5 and 10 has an energizing circuit leading from ground, through the motor field windings and a lead 132 to the positive terminal of D.-C. source 128. Hence, this motor is energized and will operate when and only when the balance switch 13 is closed.

Figure 6:
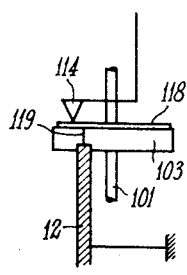
Fig. 6 illustrates a detail of Fig. 4 on a larger scale.

Articles A to be weighed are adapted to be pushed automatically off the weighing pan of the balance 1 into the outlet chute 100 by the action of a pusher member 112. The pusher member constitutes the sliding core of a solenoid 113 and is arranged to be pushed outwards to propel the article A off the balance pan on energization of the solenoid, and to be urged to a retracted position on deenergization of the solenoid by a suitable spring not shown. Solenoid 113 has one end connected to ground and its other end connected through a line 115 to the positive side of a D.-C. source 116 the other side of which is connected by a lead 117 with a contact element 114 slidable over the surface of turntable 103. As indicated in Fig. 6, the turntable is made of insulating material but has a conductive strip 118 on it in the annular path of contact 114. Moreover, the conductive strip 118 is connected by a connector 119 with the conductive walls of each of the holes or notches such as 104a. Furthermore each finger such as 106a is conductive and is grounded. Thus it is seen that the energizing circuit for solenoid 113 is completed when and only when any one of the fingers 106 has been inserted into its cooperating hole 104, at which times of course the turntable is at rest and the chute 100 registers with a predetermined one of the sorting channels.

Each of the fingers 106a—106e forms the slidable core of a related solenoid 12a—12e. The solenoids 12a—12e are the same elements as those designated by the same references in the lower part of the figure adjacent to selector contacts 11a—11e. It will be understood that they have been shown as separate parts for the sake of clarity only.

The arrangement just described operates as follows: Before an article A has been placed on the pan of the scale, the weight of the tare T tips the scales to a position in which the switch 13 is closed. Hence motor 9 is energized and operates the selector arms 5 and 10 in the manner described with reference to Fig. 1. At the same time closure of the balance switch 13 energizes relay winding 110 so that contacts 122 are open and motor 102 is deenergized, and the turntable 103 and chute 100 are stationary. When the selector arm 5 has reached a particular one of its contacts, say the fourth from the right as shown, such that the resulting balancing force F generated by coil 2 is sufficient to tip the scales to equilibrium, switch 13 is broken. Scanning motor 9 is now stopped, so that the selector stepping operation is arrested. At the same time, relay winding 110 is deenergized, and contacts 122 close, completing the energizing circuit for motor 102. This motor now starts to operate, rotating the turntable 103 and chute 100 at a suitable rate.

An additional effect of the opening of switch 13 has been to allow the voltage from source 14 to reach the selector arm 10 as described above with reference to Fig. 1. Hence, voltage is applied through the particular selector contact with which arm 10 is in engagement, in this case contact 11d, to the related solenoid 12d. Energization of solenoid 12d acts to move the finger 106d upwardly into the path of the corresponding hole 104d of the under face of turntable 103. Hence, at the particular point in the revolution of the turntable where hole 104d moves into the path of the finger 106d, the turntable will be held stationary. Chute 100 is now in alignment with the corresponding sorting channel 105.

Engagement of conductive finger 106d with the conductive walls of hole 104d has simultaneously completed an energizing circuit for pusher solenoid 113. Pusher 112 is thereby moved outwards and propels the article A into the sorting channel 105d.

Figure 3:
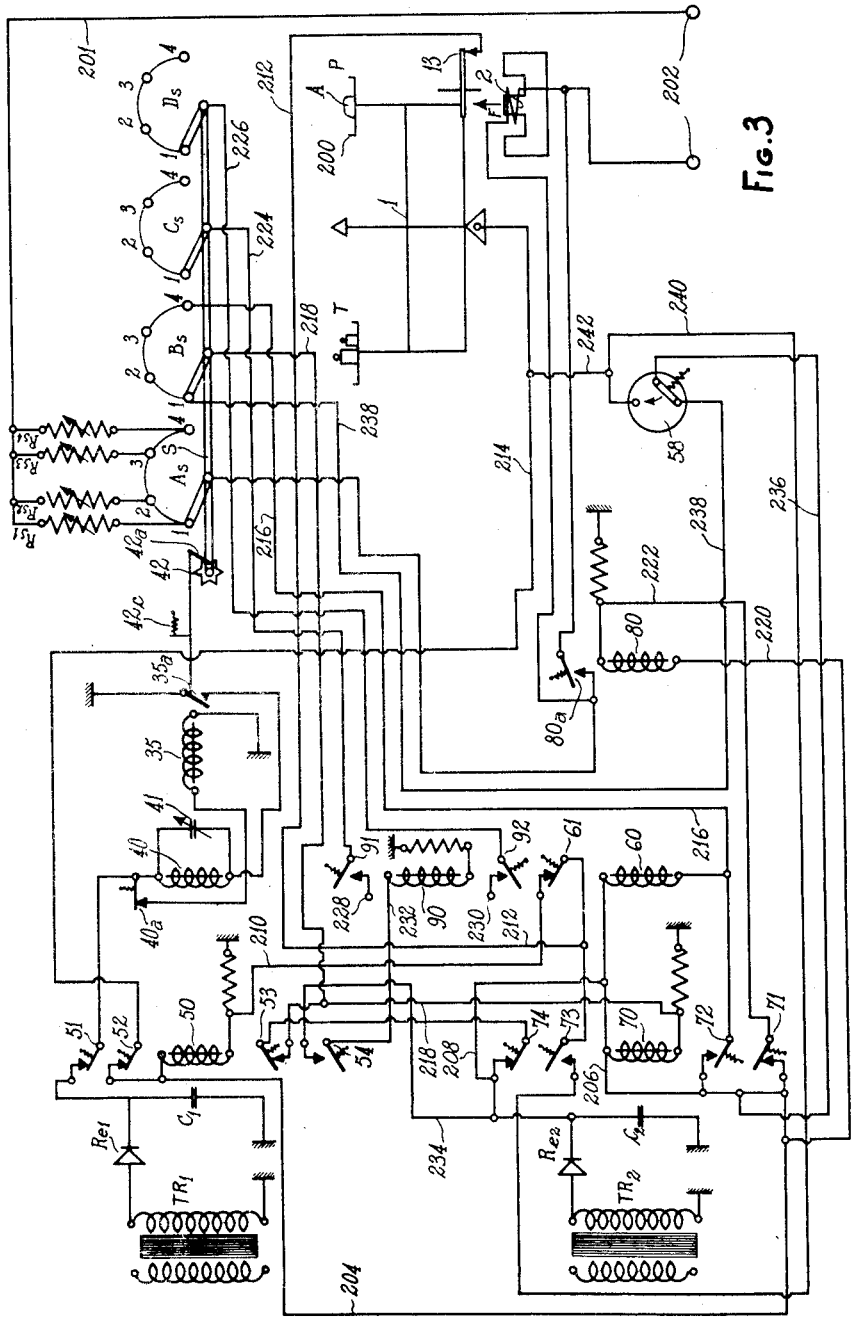
Fig. 3 is a circuit diagram of another embodiment of the invention, as applied to a continuous, cyclic automatic weighing process.

Another embodiment of the invention will now be described in connection with Fig. 3. In this embodiment, the automatic weighing system comprises a balance again schematically illustrated as a scales 1. One pan 200 of the balance, is adapted to receive objects A to be weighed, while the other pan is adapted to receive a predetermined tare T. In this embodiment, the electrodynamometer diagrammatically shown as consisting of a coil 2 wound on the centre leg of a 3-legged core, is shown by way of example, as arranged to exert an upwardly directed force on that pan of the balance which receives the objects to be weighed therein.

Figure 4:
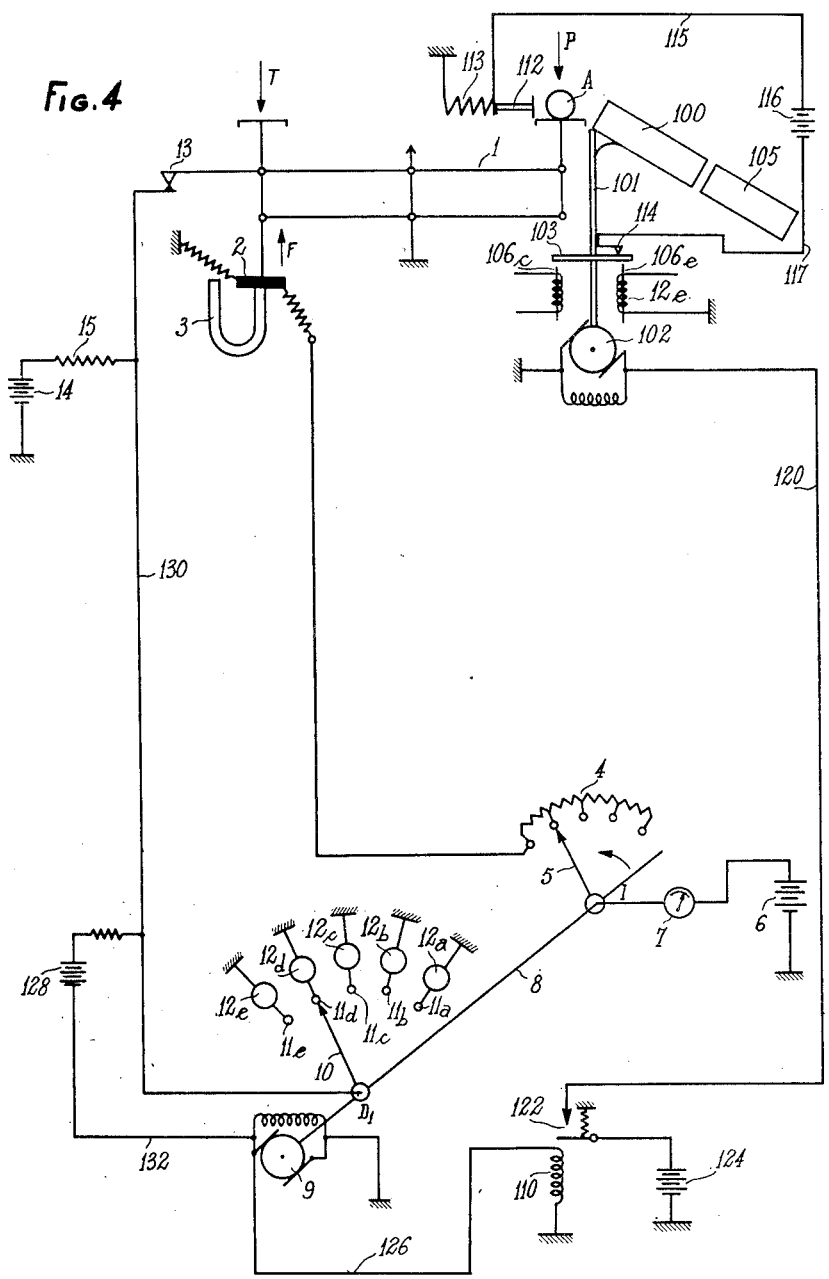
Fig. 4 illustrates an embodiment similar to that of Fig. 1, as applied to an automatic system for sorting articles according to weight.

The coil 2 is connected on one side to one terminal of a suitable D.-C. voltage source 202, and on the other side to the movable arm of a selector switch $As$, corresponding to selector switch arm 5 of Figs. 1 and 4. The contacts of the selector switch $As$, are shown to be four in number, being designated 1, 2, 3 and 4. These contacts have connected thereto the one ends of respective resistors $Rs1$, $Rs2$, $Rs3$ and $Rs4$ the other ends of which are connected in parallel by a common lead 201 to the opposite terminal of the voltage source 202. The resistors $Rs$ are calibrated to insert a decreasing resistance into the supply circuit of electrodynamometer coil 2 as the selector switch arm successively engages the selector contacts 1, 2, 3, 4. It is seen that the device comprising switch arm $As$ and contacts 1, 2, 3, 4 is functionally equivalent to resistor 4 and arm 5 of Figs. 1 and 4.

Switch arm $As$ is mounted on a rotatable shaft, which, as diagrammatically indicated, also carries three further selector switch arms $Bs$, $Cs$ and $Ds$. Each of these further arms cooperates with four contacts 1, 2, 3, 4 corresponding in position to the similarly numbered contacts associated with arm $As$. The assembly comprising selector arms $Bs$, $Cs$, and $Ds$ and associated contacts is generally equivalent in function to selector switch arm 10 and associated contacts 11 of Figs. 1 and 4.

In the embodiment now described, the selector switch assembly is automatically controlled to effect a timed sequence of operations comprising one cycle of a weighing process.

For this purpose, the shaft S, is controlled in step-by-step rotation by means of a ratchet wheel 42. This ratchet 42 is actuated by a pawl 42a normally urged out of engagement from the ratchet by a spring 42c, and adapted to be brought into engagement with the ratchet 42 to impart one step rotation thereto on movement of the movable contact arm of a pair of relay contacts 35a, on energization of an associated selector relay winding 35.

One end of selector relay winding 35 is grounded, while its other end is connected, through normally open contacts 40a of a stopper relay winding 40 and normally closed contacts 51 of a relay winding 50, to the positive terminal of a voltage supply voltage source, here shown as provided by the positive terminal of a rectifier $Re1$ connected to one end of the secondary winding of a supply transformer $Tr1$ connected across the A.-C. voltage supply. The other end of the transformer secondary is grounded, and the positive terminal of the rectifier $Re1$ is grounded through a ripple-filter capacity $C1$.

Stepper relay winding 40 mentioned above has one end connected to ground through the above mentioned relay contacts 35a, while its other end is connected through the said normally closed contacts 51 to the positive polarity of the rectified voltage source. Moreover, the relay winding 40 has an adjustable capacity 41 connected in shunt across it.

In operation, it will be seen that an energizing circuit for stepper relay winding 40 is normally completed from positive rectifier $Re1$ terminal through normally closed contacts 51, through winding of relay 40 and normally closed contacts 35a to ground. Relay winding 40 is only energized however at the end of a delay period as determined by the time constant introduced by adjustable condensor 41, whereupon contacts 40a are closed, and an energizing circuit is completed for selector actuating relay winding 35. Energization of relay winding 35 actuates the pawl 42a to impart one step rotation to ratchet 42 and to selector shaft S. Each of the selector arms As, Bs, Cs, Ds is thus caused to advance one step over the associated set of contacts.

However, energization of relay winding 35 at the same time as it has actuated ratchet 42 has also opened the normally closed contacts 35a, thereby breaking the energizing circuit for timer relay winding 40. The associated contacts 40a are then allowed to return to their normally open condition, deenergizing selector relay winding 35. Pawl 42a thereupon disengages ratchet 42 and contacts 35a are closed, again completing the energizing circuit for timer relay winding 40. At the end of the previously mentioned delay period, timer relay contacts 40a are closed, energizing selector relay winding 35 and causing the pawl 42a to impart a further step of rotation to ratchet 42, so that the selector shaft and arms advance another contact position. Thus, timed sequential operation of the selector assembly proceeds, at a rate dictated by the time constant of the timer relay circuit as determined by adjustment of capacity 41. The said time constant should be predetermined with regard to the inertia of the balance, which determines the delay required by the balance 1 to attain equilibrium at each change in the value of electrodynamic force F resulting from the change in value of the resistance Rs inserted in the supply circuit of coil 2.

Previously mentioned relay winding 50, termed the arrester relay, has one end connected to ground, while its other end is connected through leads 204, 206, 208, with the positive terminal of a rectifier Re2 connected with a supply transformer Tr2 providing a voltage supply source similar to that provided by transformer Tr1 and rectifier Re1. Obviously, a common voltage source may be used instead of two separate ones. However, arrester relay winding 50 is normally deenergized owing to a short-circuiting connection comprising the lead 210, normally closed contacts 61 of a relay winding 60, lead 212, balance-operated switch 13 which is closed so long as electrodynamic force F has not attained a value high enough to bring the balance to equilibrium position, through the beam of the balance, lead 214, normally closed relay contacts 52, and thence over the previously mentioned leads 204, 206, 208 to the positive supply terminal. Owing to this shorting connection, the arrester relay winding 50 remains deenergized so long as both the balance-operated switch 13, and relay contacts 61 are closed. However, should either or both of these contacts be opened, in a manner to be described, arrester relay winding 50 will be energized and contacts 51 will open to break the energizing circuit for selector relay 35, thereby arresting the previously described step-by-step rotation of selector shaft S and arms As to Ds.

Relay winding 60, energization of which opens the contacts 61, has one end connected through the lead 208 to the positive supply terminal, and its other end connected through a lead 216 to the endmost contact position, here designated No. 4, of the set of contacts associated with selector arm Bs. Selector arm Bs is connected by a lead 218 to ground. Thus, engagement of arm Bs with associated contact No. 4 completes an energizing circuit for relay winding 60.

In parallel across relay winding 60 is a normally open pair of contacts 72 closed on energization of a further relay winding 70. This winding has one end connected to ground and its other end connected over lead 208 to the positive supply line. However, a shorting connection is provided for relay winding 70 which comprises lead 218, normally closed contacts 53 associated with relay winding 50, normally closed (holding) contacts 74 associated with relay winding 70, to the positive supply line.

Thus it is seen that energization of relay winding 70 initially requires energization of arrester relay winding 50 to open the shorting contacts 53; however once relay winding 70 has been energized it will remain in this condition owing to the opening of its holding contacts 74, even though arrester relay winding 50 may have been deenergized in the meantime.

Connected in shunt across the electrodynamic force generating coil or solenoid 2 is a normally open pair of shorting contacts 80a. Contacts 80a are adapted to be closed to short coil 2 and thereby immediately suppress any force F generated thereby, on energization of a suppressor relay winding 80. Winding 80 has one end connected to ground and its other end connected through a lead 220 and leads 206 and 208 to the positive supply line. However, connected across suppressor relay winding 80 is a pair of normally closed shorting contacts 71 associated with relay winding 70 and opened when the latter is energized. Hence, suppressor relay winding 80 is energized to suppress the force F when and only when relay winding 70 is energized.

Selector arms Cs and Ds are connected by leads 224 and 226 respectively, and normally open relay contacts 91 and 92, to respective terminals 228 and 230, connected to a suitable operating potential, not shown. Contacts 91 and 92 are actuated by an operator relay winding 90, being closed on energization of the latter. Relay winding 90 has one end grounded, and its other end connected over a lead 232, through a normally open pair of contacts 54 arranged to be closed on energization of arrester relay winding 50, and a lead 234, to the positive supply line. Thus, when and only when winding 50 is energized, closing contacts 54, operator relay winding 90 is energized to close contacts 91 and 92, and the operating potential from terminals 228 and 230 is then applied over the leads 224 and 226 and the respective selector arms Cs and Ds, to the particular ones of the related selector contacts 1, 2, 3, 4, with which said arms are in engagement. The said selector contacts are connected through suitable control circuits to any desired load apparatus, such as marking, sorting, regulating, or/and eliminating devices, or the like.

The balance-operated switch 13 is provided with a shorting connection comprising a lead 242 branching off from lead 214, a lead 240, normally open contacts 73 associated with relay winding 70, and lead 212. Energization of relay winding 70 closes the shorting contacts 73 to short-circuit contacts 13.

A reverser switch 58 has its movable contact arm connected by a lead 236 and leads 206—208 to the positive supply terminal. In one position of the switch (as shown), said arm connects with a lead 238 leading to selector contact No. 1 associated with selector arm Bs.

In the other switch position, the switch arm makes contact with the lead 240. Thus it is seen that in the first-mentioned position of switch 58, a short-circuiting connection is adapted to be established for relay winding 70, from grounded lead 218, over selector arm Bs when in engagement with associated contact No. 1, lead 238, switch arm 58, leads 236, 206, 208, positive supply line, and back through the voltage supply to ground. Hence, with the switch 58 in this condition, relay 70 will be deenergized to deenergize suppressor relay 80 and thereby allow coil 2 to generate an electrodynamic force F, each time the selector arm Bs returns into engagement with its initial contact position No. 1 during the cyclic operation of the system.

With the switch arm 58 in its second mentioned position, opposite from that shown in the drawing, a short-circuiting connection may be completed for relay winding 50, from grounded lead 210, through closed relay contacts 61, lead 212, closed balance switch 13, balance 1, leads 214 and 242, switch arm 58, leads 236, 206, 208, positive supply line, and through the voltage supply back to ground. Alternatively, if relay winding 70 is energized at the time, the shorting connection may follow another path (disregarding the condition of contacts 13) from closed contacts 61 through closed contacts 73 and lead 240, and thence as previously over switch arm 58 and leads 236, &c.

Switch arm 58 is normally retained in its first above position by a spring, as indicated. The switch arm can be momentarily shifted to its second position at the beginning of a weighing cycle, either manually, or automatically, as by causing the placing of a fresh article to be weighed upon the pan of the balance, to actuate the switch arm against the force of the spring.

The operation of the system just described with reference to Fig. 4 will now be discussed. It may be assumed that the purpose of the weighing process is to test the weights of a series of articles whose individual weights are subject to variations about a mean or standard value $P_0$, the allowable tolerance range being $\pm \Delta p$ about the standard value $P_0$.

The electrodynamometer arrangement comprising coil 2 is so predetermined as to be capable of developing a maximum force F corresponding to the total weight tolerance range, i. e. $2\Delta p$. Upon the left pan of the balance, a tare is placed equal to the minimum allowable weight of the articles, that is $T = P_0 - \Delta p$. Under these conditions, it is seen that if a test article is placed in the pan 200 of the balance having exactly the standard weight $P_0$, the balance will attain equilibrium as the electrodynamometer develops a force $F/2$ equal to one half its total capacity.

The operation of the system will first be described in the assumption that the article being tested exceeds in weight the high limit of the tolerance range. This ensures that switch 13 is closed, so that a shorting circuit is completed for arrester relay winding 50 over grounded lead 210, initially closed contacts 61, lead 212, switch 13, the balance, lead 214, initially closed contacts 5, leads 204, 206, 208 to the positive supply line. This ensures that relay winding 50 is deenergized and contacts 51 are closed, completing the energizing circuit for timer relay winding 40. The selector assembly is thereby operated in the step-by-step manner previously described, and the selector arms A$s$, B$s$, C$s$, D$s$ advance stepwise over the related contacts.

Movement of resistance selector arm A$s$ over its related contacts causes an incremental rise in the electrodynamic force F generated by coil 2. However, in the assumed instance, the force F at no time attains a value sufficient to swing the balance to equilibrium and to open switch 13. Hence, the shorting connection for relay winding 50 remains established, arrester relay winding 50 remains deenergized, and the selector stepping operation proceeds over the full range of selector contacts. Moreover, because arrester relay 50 remains deenergized, contacts 54 thereof remain open, so that operating relay winding 90 remains deenergized, and the related contacts 91, 92 fail to close. Hence, the operating potential is at no time applied to any of the contacts associated with selector arms C$s$, D$s$, so that the load devices connected thereto remain idle.

However, at the close of the operating cycle, that is as the four selector arms engage the associated contacts No. 4 of the respective sets, engagement of selector arm B$s$ with its associated No. 4 contact completes an energizing circuit for relay winding 60 (over lead 208, winding 60, lead 216, No. 4 contact and selector arm B$s$, and lead 218 to ground). Energization of winding 60 opens contacts 61, breaking the previously described shorting connection for arrester relay 50. The latter now becomes energized and contacts 51 are opened, deenergizing the timer relay winding 40 and arresting the selector operation. Hence, the selector arms are all stopped in engagement with their No. 4 contacts, thus indicating that the weight of the tested article is above the high tolerance mark. Energization of arrester relay 50 simultaneously closes contacts 54, whereupon operating relay winding 90 is energized, and contacts 91, 92 are closed. Operating potentials are thus applied over leads 224, 226 and arms C$s$, D$s$, to the No. 4 contacts associated with the latter arms. The load devices associated with these contacts are thereby caused to operate. By way of example, the action of the load devices associated with No. 4 contacts C$s$ and D$s$ may be to direct the article just tested toward a rubbish heap or other scrap-disposal location.

Energization of arrester relay 50 has had the further action of opening contacts 53 to break the previously noted shorting circuit for relay 70, thus energizing this relay. Energization of relay 70 has two effects: first, it breaks the shorting contacts 71 for suppressor relay 80, thereby energizing this relay. This in turn makes the shorting contacts 80$a$ for the coil 2, suppressing the electrodynamic force F. The other effect of energization of relay 70 is to close the shorting contacts 72, for relay winding 60, thereby deenergizing the latter winding. Contacts 61 are now closed, thereby preparing the arrester winding shorting circuit for completion; however, said shorting circuit remains broken and arrester winding 50 remains energized owing to its open holding contacts 52.

At this stage the article just tested is removed from the pan 200 of the balance as already mentioned and is replaced by a fresh one. This latter operation may be performed automatically, for example in the manner described with reference to Fig. 4, and it may result from the application of the operating potential, as previously described, to the No. 4 contact of either of selector sets C$s$ or D$s$. It will be remembered that arrester relay 50 is still energized at this time, so that the selector stepping operation is stopped. To deenergize relay 50 and allow resumption of the stepping operations, reverser switch 58 is momentarily displaced to its upper position. As stated, this step may be performed automatically as the fresh article to be tested is supplied on the balance. Displacement of switch arm 58 to its upper position completes the previously noted shorting connection for arrester relay 50 over lead 210, contacts 61 closed owing to the above noted deenergization of winding 60, contacts 73 closed owing to energization of relay 70, lead 240, switch arm 58, leads 236, 206 and 208. Deenegization of arrester relay winding 50 causes resumption of the selector stepping process as previously described, and the four selector arms are returned into engagement with their respective No. 1 contacts. Engagement of selector arm B$s$ with its No. 1 contact completes the previously noted shorting connection for relay winding 70 over lead 218, arm B$s$, contact No. 1, lead 238, switch arm 58 now back in its lower position, leads 236, 206 and 208. Relay winding 70 is now deenergized and closes the shorting contacts 71 for suppressor relay 80, so that the latter is deenergized. This allows the coil shorting contacts 80$a$ to open, so that the normal action of the electrodynamometer is restored, and the fresh weighing cycle will proceed normally in a manner similar to that just outlined.

Assuming now that the tested object's weight lies somewhere between $P_0 - \Delta p$ and $P_0 + \Delta p$, that is within the range of tolerance, the system will operate in a manner similar to that described except that, at the point in the selector stepping process when arm A$s$ stands in engagement with a certain intermediate one of the associated resistance selecting contacts, the force F generated for the corresponding value of resistance inserted in its supply circuit is sufficient to tip the balance to its equilibrium condition, and switch 13 will open. Breaking of the balance switch 13, as previously shown, breaks the shorting connection for arrester relay winding 50, energizing the latter and breaking the energizing circuit for stepper relay 40, so that the selector arms are stopped in their then position. At the same time, deenergization of arrester relay 50 causes energization of relay winding 70 and hence energization of relay winding 80, all as previously described, suppressing the action of the electrodynamometer. Simultaneously energization of arrester relay 50 causes energization of operating relay 90, to apply operating potentials to the particular selector contacts of sets Cs and Ds in engagement with which the associated arms have been caused to stop, thereby operating any desired associated load devices, e. g. sorting devices similar to those described in connection with Fig. 4. The tested object is again removed and replaced by a further object, and switch 58 is momentarily actuated to deenergize arrester relay 50 and cause resumption of the selector stepping process.

Finally, in the event the tested article weighs less than the minimum allowable weight $P_0 - \Delta p$, it will be clear that the balance switch 13 is open from the outset of the weighing cycle. In this case, on engagement of selector arm Bs with its No. 1 contact, the shorting connection for winding 70 is completed; the resulting deenergization of winding 70 opens contacts 73 inserted in the shorting connection for arrester relay winding 50, so that the latter is now energized, and the selector stepping operation is suspended. At the same time, as before, operator relay 90 is energized and the load devices associated with No. 1 contacts are operated, for example to scrap the underweight article. A fresh article is then placed on the balance and switch 58 is actuated to break the shorting circuit for relay 70, whereupon this relay is energized. This simultaneously opens contacts 71 and closes contacts 72; relay 60 is deenergized and the contacts 61 complete the shorting circuit for arrester relay 50, whereupon selector stepping is resumed. At the same time, the opening of contacts 71 causes energization of suppressor relay winding 80, suppressing the action of the electrodynamometer coil. Hence, the selector will now be stepped throughout its full operating cycle, since no balancing force F is now generated. As the arm Bs reengages its No. 1 contact, relay winding 70 is shorted as previously described, resulting in the deenergization of suppressor relay 80, so that the normal scanning process is resumed in connection with the fresh object. It will be understood in connection with Fig. 3 that the circuitry there disclosed is purely schematic and exemplary, and that numerous modifications may be made therein as will be well understood by those familiar with the art. Thus the make-and-break status of the various relay contacts may of course be reversed without affecting the functions involved. Moreover, conventional R-C networks may be inserted where desirable for minimizing sparking and the like.

The number of contacts in each selector set such as As, Bs, Cs, Ds, may be arbitrarily varied, as may also the number of such selector contact sets provided. Means different from these described may be used to provide for the stepping operation of the selector arms; thus electronic timing means, such as discharge tube circuits, may be used instead of the capacitance network shown.

Various modifications may be made in the embodiments illustrated, and other embodiments of the invention may be concerned within the scope of the claims.

What I claim is:

1. In a weighing system, weighing means adapted to receive an object to be weighed and having an equilibrium condition, means exerting a biassing force on the weighing means, means including a variably energizable electromagnetic coil for exerting an additional balancing force on the weighing means in proportion to a variable energizing current flowing through said coil, an energizing circuit for said coil, a controller connected in said circuit and comprising impedance means, a plurality of contact positions and a rotatable arm engageable with said contacts to insert various amounts of said impedance means into said circuit to incrementally vary said energizing current, selector means comprising at least one further arm and a set of selector contacts associated with each said further arm, means for rotating said arms so that said arms will simultaneously engage respectively corresponding contact positions thereof, an energizable load circuit connected to each of said selector contacts, energizing means for said load circuits, and switch means operated by said weighing means on attainment of said equilibrium condition and effective when operated to apply said energizing means to the particular load circuit connected with the selector contact engaged by said selector arm on attainment of said equilibrium condition.

2. In a weighing system, weighing means having an equilibrium condition, means exerting a biassing force on the weighing means, means including an electromagnetic coil for exerting an additional balancing force on said weighing means, an energizing circuit for said coil, a controller connected in said circuit and comprising resistance means, a plurality of contact positions and a rotatable arm engageable with said contacts to vary the amount of said resistance means in said circuit to vary the energization of said coil and incrementally vary said balancing force, selector means comprising at least one further arm and at least one associated set of selector contacts corresponding in number and position to said controller contacts, means for simultaneously rotating all said arms, energizable load means respectively associated with each of said selector contacts, selective energizing circuits for said load means and including the associated selector contact and said selector arm, disabling means normally preventing the completion of any one of said load energizing circuits from energizing the related load means, and a switch connected to said load-energizing circuits and operated by the weighing means on attainment thereby of said equilibrium condition to disable said disabling means, whereby engagement of said selector arm with a selector contact will energize the associated load means.

3. In the system claimed in claim 2, means operated by said switch for disabling said arm-rotating means.

References Cited in the file of this patent

UNITED STATES PATENTS

| 1,629,221 | MacNutt | May 17, 1927 |
| 1,717,462 | Nagaoka | June 18, 1929 |
| 2,096,572 | Brunkow | Oct. 19, 1937 |
| 2,371,040 | Fisher | Mar. 6, 1945 |
| 2,590,704 | Howard | Mar. 25, 1952 |

FOREIGN PATENTS

| 102,936 | Germany | May 12, 1899 |
| 531,316 | Germany | Aug. 8, 1931 |

OTHER REFERENCES

Serial No. 386,957, Popou (A. P. C.), published May 25, 1943.